US008146125B2

(12) United States Patent
Grinkemeyer et al.

(10) Patent No.: US 8,146,125 B2
(45) Date of Patent: Mar. 27, 2012

(54) COMPUTERIZED DEVICE AND METHOD FOR ANALYZING SIGNALS IN A MULTIMEDIA OVER COAX ALLIANCE (MOCA) NETWORK AND SIMILAR TDM / ENCRYPTED NETWORKS

(75) Inventors: Douglas Grinkemeyer, Germantown, MD (US); David Dailey, Boyds, MD (US)

(73) Assignee: Spirent Communications, Inc, Sunnyvale, CA (US)

( * ) Notice: Subject to any disclaimer, the term of this patent is extended or adjusted under 35 U.S.C. 154(b) by 323 days.

(21) Appl. No.: 12/496,545

(22) Filed: Jul. 1, 2009

(65) Prior Publication Data

US 2011/0001833 A1 Jan. 6, 2011

(51) Int. Cl.
*H04H 60/32* (2008.01)
*H04N 7/18* (2006.01)
*H04N 7/173* (2011.01)
*H04N 17/00* (2006.01)
*H04N 17/02* (2006.01)

(52) U.S. Cl. ............. 725/107; 725/14; 725/74; 725/78; 348/180; 348/192

(58) Field of Classification Search .................. 725/120
See application file for complete search history.

(56) References Cited

U.S. PATENT DOCUMENTS

| 7,075,981 | B1 | 7/2006 | Clark | |
|---|---|---|---|---|
| 2004/0124864 | A1* | 7/2004 | Feld et al. | 324/755 |
| 2006/0221876 | A1* | 10/2006 | Kosanovic et al. | 370/286 |
| 2008/0013612 | A1* | 1/2008 | Miller et al. | 375/224 |
| 2008/0089239 | A1* | 4/2008 | Todd et al. | 370/252 |
| 2008/0120675 | A1* | 5/2008 | Morad et al. | 725/120 |
| 2008/0285476 | A1* | 11/2008 | Rajakarunanayake | 370/252 |
| 2009/0046595 | A1* | 2/2009 | Clark | 370/252 |
| 2009/0248794 | A1* | 10/2009 | Helms et al. | 709/203 |
| 2009/0303876 | A1* | 12/2009 | Wu | 370/230.1 |

OTHER PUBLICATIONS

Telchemy—VQmon/EP, VQmon Performance, accessed on Dec. 30, 2008 at http://www.telechemy.com/vqmonperf.html, pp. 1-4.
Clark, Alan, "Non-Intrusive Monitoring of VoIP Call Quality," Telechemy Incorporated, 2002, pp. 1-29.
VQmon/SA-VM 2.2, Telchemy, Incorporated, 2006, pp. 1-2.
CompuLab Products p. CM-X270 Computer-On-Module, accessed on Dec. 30, 2008 at http://www.compuland.co.il/x270cm/html/x270-cm-datasheet.htm, pp. 1-4.

* cited by examiner

*Primary Examiner* — Justin Shepard
(74) *Attorney, Agent, or Firm* — Haynes Beffel & Wolfeld LLP; Ernest J. Beffel, Jr.

(57) ABSTRACT

The present invention relates to testing signals on a coaxial home network that carries a digital video signal. It has direct application to testing so-called Multimedia over Coax Alliance (MoCA) standards-compliant networks and applies to similar networks. In one mode, a computerized device joins the MoCA network and relays signals intended for a set-top-box to the STB. In another mode, the computerized device joins the MoCA network instead of the STB and tests signal strength, attenuation and similar physical layer characteristics.

20 Claims, 8 Drawing Sheets

Figure 3
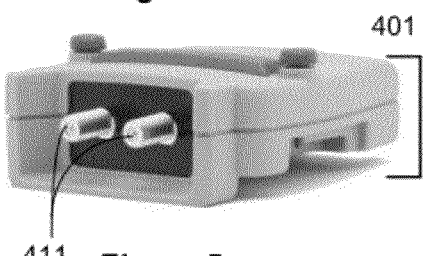
Figure 4
Figure 5
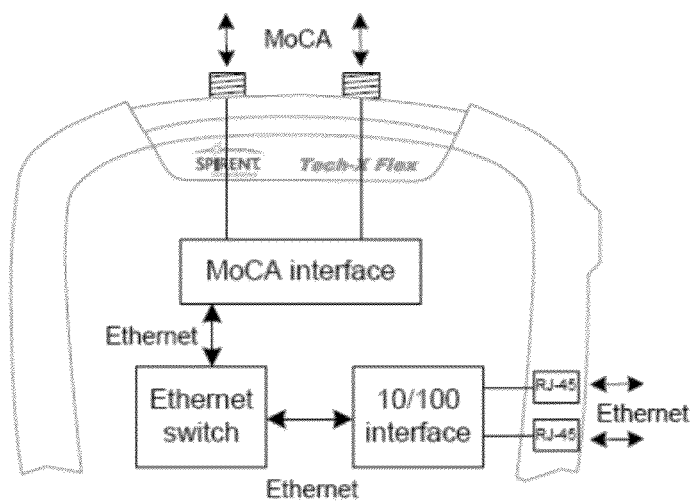
Figure 7

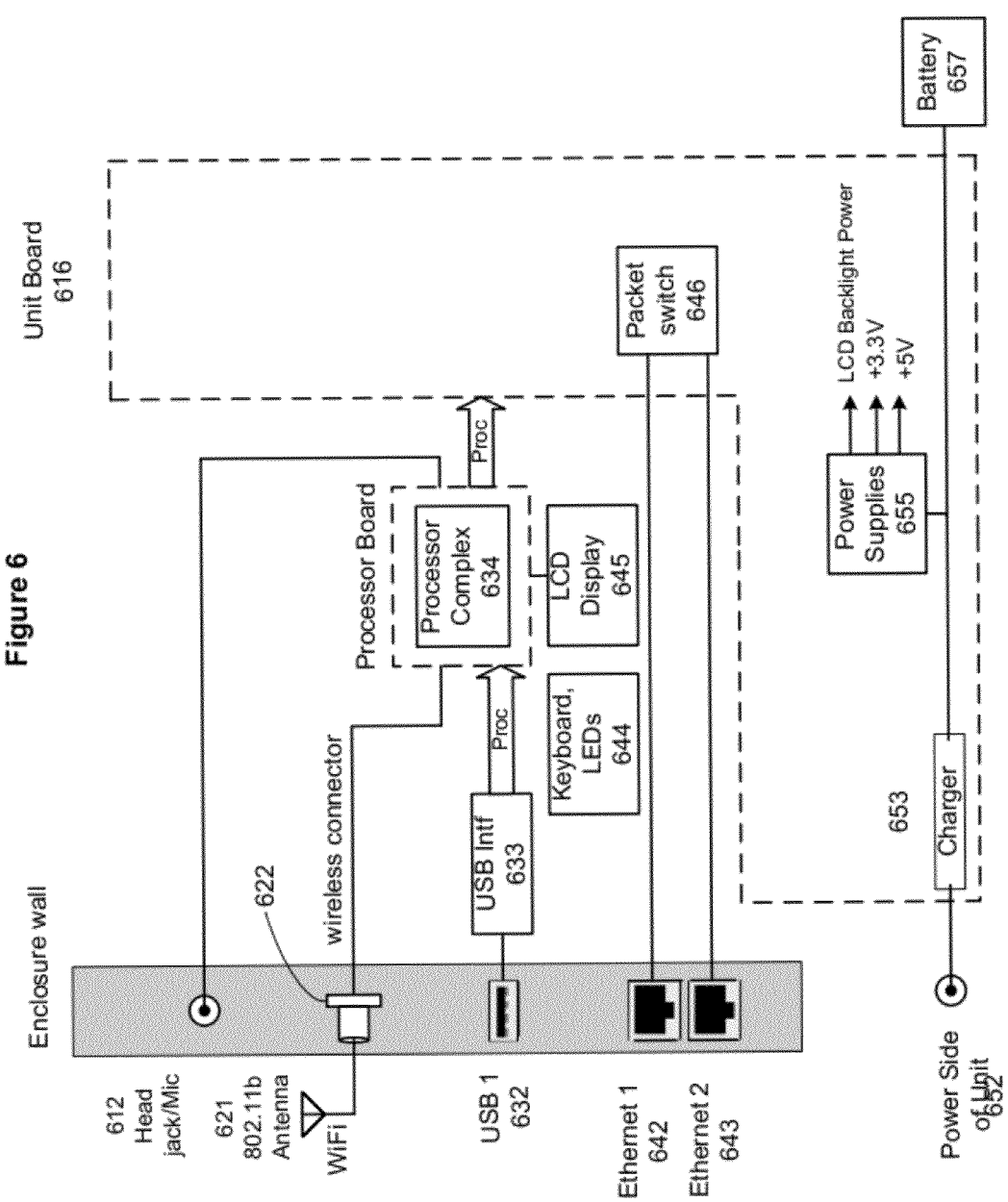

Tech-X Flex

Stream Metrics | Stream Description | Video Scores

|  | I | P | B |
|---|---|---|---|
| Frames | 44 | 46 | 45 |
| Lost | 53 | 55 | 54 |
| Discards | 47 | 49 | 48 |
| Impairments | 50 | 52 | 41 |

| FEC Effect | 58 |
|---|---|
| Opt FEC Blk Size | 59 |
| Opt FEC Crct Pkts | 60 |
| Peak/Mean Rcv Rate | 1.01 |

Summary | Transport | | Save

Figure 14

Tech-X Flex

Stream Metrics | MPEG Stats | Jitter/Delay Stats

| Pkt Discard Rate | 19 |
|---|---|
| OOS Pkt Rate | 20 |
| Burst Loss Rate | 32.00% |
| Burst Length | 33ms |
| Gap Loss Rate | 37.00% |
| Gap Length | 38ms |

Summary | Stream | | Save

Figure 15

COMPUTERIZED DEVICE AND METHOD FOR ANALYZING SIGNALS IN A MULTIMEDIA OVER COAX ALLIANCE (MOCA) NETWORK AND SIMILAR TDM / ENCRYPTED NETWORKS

COPYRIGHT NOTICE

A portion of the disclosure of this patent document contains screen displays that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This application relates to testing of small networks. In particular, the technology described is useful for testing a coaxial-cabled network running a protocol such as MoCA.

Competition for delivery of video to the home has intensified in stages. Over the air transmission first met competition from cable companies. Then came the satellite providers. More recently, telephone companies have begun deploying video and video on demand using their wiring plants. The more one provider seeks to distinguish itself from others, the more alternative services become available.

One current issue faced by providers is servicing multiple set-top boxes and other devices in a home or small business, for instance after deploying fiber to the home (FTTH) for signal delivery. Some estimates of the time required to bring up IPTV for a new customer are as high as five to eight hours per home. This is too much time to permit rapid deployment to new customers. Moreover, a customer with a chronic problem, such as corrupted video content, can consume even more resources and create a further drag on deployment.

Wiring inside homes can be both a source of problems and an asset for deployment. Industry standards are being developed for use of existing wiring, including the Home Phone Network Alliance (HPNA), Multimedia over Coax (MoCA) and, increasingly, powerline technologies, all of which allow service providers to deliver their triple play services without rewiring a home. While these technologies permit deployment using existing wiring, the providers must change their old strategy of demarcation for responsibility. The providers need to deliver their signals to the TVs that use them. No customer who is paying for delivery of video on demand or IPTV will accept a provider's assurances that the signal is strong at the sidewalk, when the TV inside the house cannot use the signal.

In older homes, copper wire that may be sufficient for phone calls might become degraded to the point that it is not optimal for triple play or even data services. Similarly, coaxial cable can be degraded by the addition of splitters and devices that cause interference. Even the new Ethernet CAT-5 cabling can be challenging. Still, the existing wiring plant is often the only viable alternative, especially for customers who prefer not to have holes drilled through their walls.

As home networks become more prevalent and consumers/ small businesses tend to have some kind of network in place, providers take on responsibility for delivery of services across customer-provided networks. Current instrumentation, such as a digital voltage ohm meter, an RF tester, an optical loss meter, or even a spectrum analyzer have proven inadequate for the task. These tools are not designed to analyze traffic or bandwidth a local area network. Nor can they test actual IP video service, such as shared digital video recorders. This has led the assignee of this application and other vendors to develop new products, as described by Sean Buckley, in "BBWF: Test twice, roll the truck once" (Sep. 29, 2008) accessed at http://www.telecommagazine.com/article.asp? HH_ID=AR_4489 on Dec. 30, 2008.

An opportunity arises to introduce improved testing devices and protocols. Testing technologies with easy-to-read output may reduce the burden of training field technicians while enabling them to collect data regarding loop, media Gateway and in-home issues that enable to tier ⅔ or NOC personnel to suggest effective solutions.

SUMMARY OF THE INVENTION

The present invention relates to testing signals on a coaxial home network that carries a digital video signal. It has direct application to testing so-called Multimedia over Coax Alliance (MoCA) standards-compliant networks. In one mode, a computerized device joins the MoCA network and relays signals intended for a set-top-box to the STB. In another mode, the computerized device joins the MoCA network instead of the STB and tests signal strength, attenuation and similar physical layer characteristics. Particular aspects of the present invention are described in the claims, specification and drawings.

BRIEF DESCRIPTION OF THE DRAWINGS

FIGS. 3-5 depict a physical embodiment of a test unit. FIGS. 4 and 5 depict the MoCA module by itself and installed in the test unit.

FIG. 6 is a high-level block diagram of components of the main unit, not including the MoCA module.

FIG. 7 depicts combination of the MoCA module with Ethernet components to provide a MoCA to Ethernet interface.

FIGS. 8-17 depict one version of displays that can be used by a technician conducting diagnostics with the unit. FIG. 8 depicts graphical confirmation of the test set-up.

FIG. 9 gives an overview of MoCA testing. It shows the configuration of both LAN and WAN channels.

FIG. 10, is a bandwidth page of statistics regarding the network among MoCA devices.

FIG. 11 depicts a bit loading graph that can indicate the presence of an interferer.

FIG. 12 depicts a summary of MOS scores over time.

FIG. 13 depicts stream analysis with particular diagnostic details.

FIGS. 14-15 provide further stream metric statistics. FIG. 14 provides stream analysis results that impact video quality of service. FIG. 15 illustrates a video quality of service display, particularly the stream metrics tab.

FIG. 16 illustrates one measure of channel change time.

FIG. 17 illustrates running an IP video test script and providing a user with an evaluation of multiple diagnostic indications.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Vocabulary

Some vocabulary and background are useful.

Unit—A test device, such as a Tech-X Flex™, with or without a module attached, that embodies the technology described.

Base Unit—The core handheld component to which modules attach. The base unit has an independent suite of functionality which is described in this document. The use of modules does not change base unit functionality.

Module—A modular hardware component designed to attach to and interface with the Tech-X Flex base unit, which provides additional functionality.

Provider—A broadband service provider, such as a telephone or cable company.

Subscriber—A customer receiving broadband services from a provider.

Additionally, note the following common acronyms:

DVR—Digital Video Recorder
FTTH/FTTP—Fiber To The Home/Fiber To The Premises
BHR—Home Broadband Router
HPNA—HomePNA or home power network adapter. Competes with MoCA.
IP—Internet Protocol
IPTV—IP Television
LAN—Local Area Network
MoCA®—Multimedia over Coax Alliance
NC—Network Controller
NT—Network Terminal
ONT—Optical Network Terminal
OSP—Operator Service Provided
STB—Set-Top Box
VoD—Video on Demand
WAN—Wide Area Network MoCA is a signaling protocol adapted for use on coaxial cable. The MoCA Alliance publishes material at www-.MoCAlliance.org. As of 2009, distribution of the MoCA MAC/PHY specification v1.0, "MoCA-M/P-SPEC-V1.0-04052007" was on a limited, confidential basis, per the Alliance's FAQ at http://www.mocalliance.org/en/aboutus/faq.asp. Version 1.1 has been released and will be integrated into the product.

The unit that we describe can be used by itself or in pairs to diagnose signals received from the provider and signals exchanged among devices within the home. One use that we highlight positions the test unit in-line, between a BHR and a STB, to diagnose problems as they appear on a TV or video monitor. Establishing this in-line diagnostic capability is greatly complicated by the many MoCA operating parameters that change dynamically. These inventors determined that in-line diagnosis effectively requires the unit to join the network, appearing to the network has a set-top box or other device that is being monitored and evaluated and, appearing as the BHR.

Introduction to in-Line Testing

Figure 2:
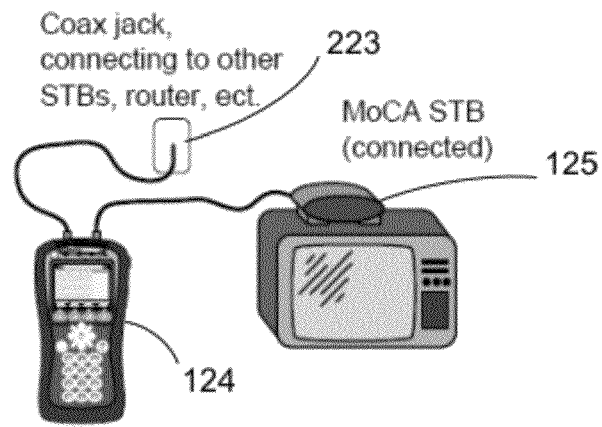
FIG. 2 depicts a test unit coupled in-line between a jack and a set-top box.

In-line testing of observed video problems on a MoCA network begins with coupling a test unit in a pass-through mode to a coaxial connection proximate to a set-top box, as depicted in FIG. 2. The unit learns the physical and data link characteristics of time division multiplexed RF communications between the home broadband router and the set-top box being tested, so that it can emulate the STB to the BHR and the BHR to the STB. The test unit calculates video quality statistics from packet characteristics while the user observes video problems on the video display, to catch the signal "in the act."

This in-line testing set-up is contrary to the basic design principles of MoCA networks, which will be further described below. First, in-line coupling destroys the mesh architecture of the network, by isolating the STB from the rest of the network. Second, it involves the test unit communicating with two logical networks using the same channels. In the MoCA architecture, the BHR is the only device that communicates with two distinct logical networks. The MoCA specification requires separation of the two logical networks onto different channels that use different frequencies. Typically, the provider's WAN uses one of the A-C channels and the customer's LAN uses the D channels. The BHR communicates on a single mesh network, across a single terminal, and relies on the frequency separation to keep the logical networks distinct. Contrary to MoCA network architecture, in-line testing of the physically isolated STB involves using test unit to communicate with both the BHR and the STB using the D channels. Third, in-line testing uses dual MoCA signal processors to keep the logical networks physically separated. Instead of addressing two networks using the same terminal, as described above for a BHR the in-line testing that we describe uses two terminals and two RF circuits, isolated from one another.

MoCA Alliance and Networks

The MoCA alliance describes itself as an "open, standard body promoting networking of multiple streams of high definition video and entertainment using existing coaxial cable already in the home." The Alliance was formed in response to increasing use of packetized, IP-based protocols to deliver multimedia services, such as IPTV and video on demand, in an effort to make use of existing physical medium within the home. For high-bandwidth packet transport, the ideal medium would be a network of fiber or CAT-5 copper cabling. However, most homes do not have this infrastructure and installation would be costly and inconvenient. Many more homes have coaxial cable, due to the prevalence of cable TV and outdoor antennas. Accordingly, MoCA is intended to allow a service provider to deliver next-generation, packet-based services over existing coaxial cable. See, Ladd Wardani, "Home Networking On Coax For Video And Multimedia" accessible (on Jan. 3, 2009) at http://www.mocalliance.org/en/industry/briefs/06310r00MCA_Members-Home_Entertainment_Over_Coax_2006.pdf, "MoCAProtocols: What exactly is this MoCA thing?" accessible (on Jan. 3, 2009) at http://www.mocalliance.org/en/industry/presentations/2007_11_14_TechConference/docs/Mo CAProtocols.pdf, see, generally, materials accessible (on Jan. 3, 2009) at http://www.mocalliance.org/en/industry/presentation.asp. The coaxial cable is favored over other existing media, such as telephone lines, electrical wires and wireless broadcast, because it is shielded, conveniently located where video devices are found in the home, joined with commercial splitter devices, making electrical characteristics of joints more predictable, and more secure and reliable the wireless. Using coaxial cable, MoCA has a theoretical data rate of up to 250 Mbps between devices. Actual data rates are normally lower due to line attenuation. Actual rates used on the MoCA network are determined dynamically.

Figure 1:
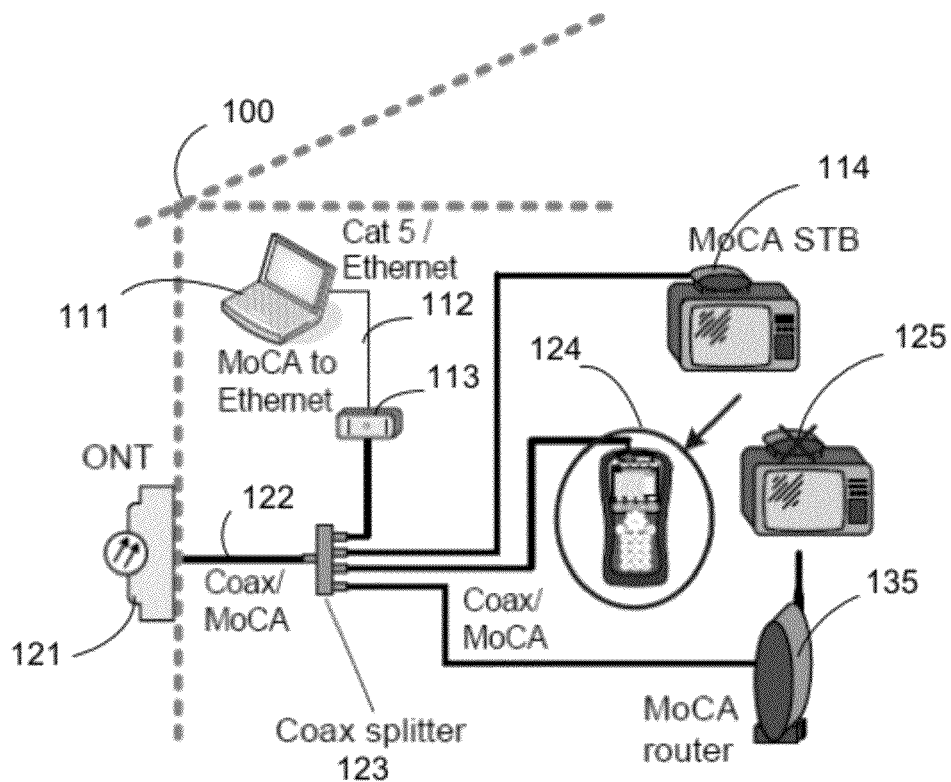
FIG. 1 depicts a MoCA network.

FIG. 1 depicts a MoCA network. The home 100 is indicated with the dashed line. A provider delivers service to a termination point, such as an optical network terminal 121. This termination point may be inside or outside the home. Signal carried on a coaxial cable to 122 is distributed using a splitter 123. Devices that may receive the signal included a MoCA to Ethernet adapter 113, a set-top box 114 and a router 135. The router 135 control signaling among the other devices 113, 114. Typically, the router receives the signal from the termination point and re-broadcasted to the other devices.

While FIG. 1 shows a fiber-to-the-premises architecture where the optical network terminal terminates the optical network and converts it to MoCA, broadband service could be delivered by other technologies, such as high-speed DSL or RF cable. A MoCA architecture within the home will generally be the same regardless of the network architecture that streams content to the BHR.

MoCA operates on a physical mesh of coaxial cable, where junctions are formed using coaxial splitters. This differs from a switched Ethernet web network using twisted-pair CAT-5 copper wiring, which typically uses a hub, switch or similar device at junctions to split and manage signals. In a MoCA network, all devices are directly interconnected, including the router. Therefore, the provider's WAN and the customer's LAN coexist on the same cables, using different frequencies or channels. The router uses a single port for input and output signals. It uses internal circuitry to differentiate between the WAN and LAN traffic.

The MoCA logical network concept operates much differently from the familiar collision-detection networks. On the MoCA network, the router (BHR) acts as the network controller (NC), with other devices acting as clients. The NC manages traffic flow by coordinating data transmission among network devices. In order to transmit, a client device requests bandwidth from the NC, which periodically sends out a schedule that specifies which device can transmit and when. The NC, therefore, replaces other traffic management devices and protocols found on other types of networks. For instance, it replaces switches and collision prevention/detection technologies. By specification, any MoCA-ready device can act as the NC. A network may be configured to automatically select an NC that assures continued operation of the network, should any particular NC fail or be removed from service. The router is often a preferred candidate to serve as NC, because it sees both sides of the network traffic. Potentially, the router will serve as NC for both the WAN and LAN.

An Ethernet-based connection can be linked to a computer 111 via an Ethernet cable 112 and a MoCA/Ethernet Bridge 113. While set-top boxes and other multimedia devices are typically MoCA-ready and plugged directly into coaxial cables, home computers use other protocols. Increasingly, the provider supplies Internet service to a home network, in addition to TV service, so MoCA to Ethernet connectors are frequently present.

MoCA Network Configuration

MoCA network is designed for self-maintenance and dynamic adjustment for optimal performance, which requires a significant amount of management traffic between devices. We briefly describe a subset of this traffic that is particularly applicable to testing with the MoCA module. For more information, including descriptions of traffic not mentioned here, see the MoCA Alliance's technical specification, referenced above.

At the physical layer, a MoCA network broadcasts on one of several available channels between 850 and 1525 MHz, with each channel spanning 50-100 MHz in its spectrum usage. The available channels are organized into bands, with one channel per band permitted for use on a logical network. In some cases, though, multiple channels from different bands may be active for different logical networks, such as the case where a WAN and LAN are operating on the same coax mesh.

To construct the physical layer bitstream, MoCA uses a quadrature amplitude modulation (QAM) scheme, where the channel is divided into subcarriers of varying frequency and phase. These subcarriers are then organized to create "symbols," which is the fundamental QAM entity that carries bits across the line. The theory behind QAM symbols is complex and beyond the scope of this document, but the following points are relevant: The MoCA specification indicates a goal of 256-QAM, which allows each symbol to carry 8 bits with a full constellation. The actual maximum bits that any given symbol can carry depends upon line conditions, which impact the physical ability of the line to reliably transport the applicable subcarrier frequencies.

For any coax network, the path between any two devices can vary widely due to their respective line lengths, reflections, splitter configurations, and other conditions. Furthermore, for any given path, the ability of the cable to reliably transport different frequencies can vary, even between frequencies that are close on the spectrum. To account for these variances, the devices on a network regularly send physical-layer "probe" messages to each other to evaluate the physical network between them. Using this messaging, the MoCA devices are able to construct an appropriate "profile" for transmission to each other, which includes how many bits that each symbol should attempt to carry (known as the bit loading.) A device may determine that some symbols can not reliably carry 8 bits and mandate a lower number, or even restrict the transmission on certain subcarrier frequencies altogether. In any given network, each device has a separate profile for communication with each other device, to improve network performance.

At the data link layer, MoCA uses Ethernet over the underlying bitstream, with time division multiplexing. Two basic types of traffic are sent via Ethernet: link control frames that contain MoCA network management messaging; and data frames that contain the end-user application data (Internet, IPTV, etc.) Two primary types of link control frames are bandwidth requests and media access plans (MAPs.) Because the meshed nature of the network allows only one device to transmit at any given time, the network controller (NC) must coordinate all transmission by all devices. When a device wants to transmit, it sends an bandwidth request to the NC. In turn, the NC regularly broadcasts its MAPs which are effectively precise schedules about which device can transmit and when. Not only does a MAP tell a device know when it should transmit, it allows a device to detect when to expect transmission from another device.

Another type of link control frame is an admission request and associated negotiation messages. When a new device is connected to the network, it must ask the NC for admission to the network and then complete a set of qualifying steps. It finds the appropriate channel and the NC location by a mechanism known as beacons, which the NC regularly broadcasts. Because admission link control is initiated by a new device, no admission link control would be expected on a stable network.

The steps taken to configure the physical and data link layers make it useful for a test unit either to join the MoCA network as a device or, at least to be present when the physical and data link layers are defined. Given the structure of these layers, it is easier to learn the definitions of the data streams present than to attempt to reverse engineer them from the data flow.

Troubleshooting Examples

Several problems related to coax cabling can affect MoCA performance, or even prevent MoCA transport completely. A fault in the coax, such as a nail through the cable, can prevent transmission by causing a short. Because a MoCA network is a mesh, a critical short-circuit can prevent the transport of any MoCA signaling, including WAN and LAN. A bad connection, perhaps caused by corrosion, a loose connector, or poor connector crimping, can impact a segment of the network. Attenuation or weakening of the signal due to the excessive use of splitters or splitter configurations can make the signal unusable. In particular, the presence of "splitter jumps," where two devices communicate through the outputs of one or more splitters, can impact line characteristics. Excessive cable length also attenuates the signal. A powered signal amplifier on the network can interfere with transmission, unless the amplifier is specifically designed to bypass frequencies in the MoCA spectrum, 850 to 1525 MHz. Ultimately, any condition that increases line attenuation will decrease the reach and performance of a MoCA network.

The MoCA module disclosed allows the test unit to join a MoCA network as a router or a STB for trouble shooting purposes. After joining the network, the unit can perform a variety of functions. Its capabilities include retrieval of statistics about other devices (or nodes) on the network, including the bandwidth between devices; IP address assignment; basic connectivity tests such as ping and traceroute; and video testing, both by actively joining a multicast stream and by passively monitoring an existing stream.

There are two basic physical setups for the unit, when testing a MoCA network. The unit can be connected to a single coaxial cable, to emulate a STB, router or other component. Or, two coaxial cables can be connected to the unit, where the unit emulates a STB to the BHR and emulates the BHR to the STB.

It is useful to understand field testing scenarios that a technician might encounter, to assist with understanding the embodiments disclosed. The next few paragraphs identify issues that might be encountered and provide suggested troubleshooting approaches. Use of the unit may vary according to field conditions and applicable protocol.

Issue: No broadband service is available within the home.

Troubleshooting suggestions: Ensure that all coaxes are properly connected, then use an RF tester or the unit to verify presence of a signal on the network. If the network has no RF signal, the provider's network terminal (NT) is likely faulty. If an RF signal is available, use the unit to emulate the router to verify that the MoCA network carrying the WAN is functional. If you cannot synchronize with the network, several potential problem sources should be considered. The NT may be faulty. There may be a critically-faulted coax or splitter somewhere in the network that prevents any reliable signal transport. Consider disconnecting coaxes individually and retesting until the problem is sectionalized. Also, consider testing for a short with a basic resistance test, using an ohmmeter or the unit to test resistance across the coax conductor and the shielding.

If the in-home MoCA network is available, the problem might exist with the coax leading out of the home or associated connections.

The MoCA Statistics function of the unit allows one to check the bandwidth between the unit and the NT, possibly revealing coax-related problems. A faulty or improperly-configured router may be present. Improperly configured MoCA network devices, such as devices having incorrect passwords, may be at fault. Or, there may be a critical problem with the provider network (WAN) upstream.

Once the unit synchronizes with the respective MoCA network, the tester can use the IP Network Setup feature of the unit, described below, to attempt to join the WAN and conduct logical connectivity tests upstream.

Issue: One TV in the home has a poor and/or intermittent picture.

Troubleshooting suggestions: Couple the unit at and emulate the STB for that TV. Check the bandwidth between the router and that STB. If bandwidth on that link is poor, look for a physical cause on the coax connecting the two. If bandwidth is OK, couple the unit to the STB, in-line with the STB and use the unit to measure video quality while watching the poor video on the TV. If video quality measures poor, the problem is likely with the IPTV stream source upstream. If video quality measures OK on the unit, consider a problem with the STB. If video quality measures poor, consider looking at expert statistics and contacting tier two or three personnel.

Issue: All TVs and perhaps other network devices exhibit poor performance.

Troubleshooting suggestions: Emulate the router and check the bandwidth between the router and the provider network terminal (NT). If bandwidth is poor, there may be a problem with the NT, the coax between the router and NT, or possibly the provider network upstream. It may be useful to connect directly to the NT and emulate the router, then join the WAN to perform video quality measurements. If you can measure good video quality at the NT, the provider network can be ruled out as the cause.

Issue: TVs work OK, but a computer in the house is slow or cannot connect.

Troubleshooting suggestions: Couple the test unit to the coax at the MoCA/Ethernet bridge device and emulate a STB to check bandwidth between the router and the bridge device. If bandwidth is OK, use the unit to run connectivity tests such as ping and the web browser to verify internet availability. If connectivity is OK, the Ethernet cable or computer itself may be suspect.

Other issues and troubleshooting approaches will be apparent to the user, as this list is not intended to be exhaustive.

Physical Embodiment of the Test Unit

FIGS. 3-5 depict a physical embodiment of a test unit. In this embodiment, the unit is a modular platform. It includes a color screen (325), which may be touch sensitive, a keypad (365), and a kickstand. It weighs approximately two pounds and is 8.85 inches by 2.0 inches by 3.80 inches. In time, it is expected that the weight will drop and the form factor will become smaller, just as smart phones have become lighter and smaller in time. On the front, it includes switches for power on/off (312), enter (331), exit (341), contrast (351), help (361) and N1 (371). LED indicators (313) may be used to indicate synchronization, data transmission, error detection and charging status of the unit. Soft function keys (335) can be provided as an alternative to use of a touchscreen. Arrow keys (345) or other navigation may be located proximate to the enter key.

FIGS. 4 and 5 depict the MoCA module detached from and installed in the test unit. The MoCA module (401) includes a pair of coaxial terminals (411). Not shown are connectors that couple the MoCA module to the main unit. On the sides of the main unit, interfaces are optionally provided for Ethernet (two RJ-45 connectors), a WiFi antenna, a headset with microphone, USB and an external power adapter. A battery pack allows the unit to operate without connection to AC power. The case may be made out of polycarbonate or any suitable plastic. Optionally, the unit also may include a slot for addition of memory, such as a memory card.

The components of this unit are selected with quality and durability appropriate to the target market. An initial target market may be service technicians, but a later target market might be home hobbyists or general computer technicians. A high-resolution color screen (e.g., Anders VGA TFT LCD model TD035STEE1) allows the display graphical diagrams, web pages and video, including training videos. A touch-screen enables the use of a soft keyboard for text entry, navigation of a web page for service set up and configuration and for integration of the unit into a web-based dispatch system as an access terminal. A memory card can include program memory for adding new applications to the unit without redesign. WiFi support built into the unit will enable diagnosis of wireless components without an external module or adapter. USB support allows the unit to be adapted to external drives, devices and accessories, such as cellular modems, keyboards and printers. Dual Ethernet jacks allow the system to control flow of packets and perform Ethernet testing, while being remotely control. The headset and microphone connection allows the unit to be used as telephone, placing, receiving and recording calls over POTS and VoIP networks.

FIG. 6 is a high-level block diagram of components of the main unit, not including the MoCA module. At the enclosure wall, the listed interfaces include a jack for a headphone or microphone (612), and antenna connector (622) for an external antenna (621), such as a WiFi or WiMax antenna, a USB adapter (632) and one or more Ethernet adapters (642, 643). An adapter for receiving an external powers source also may be provided (652). More complete details of connections between these interfaces and the processor Board (634) can be found at Compulab's product page, accessible (as of December, 2008) at http://www.compulab.co.il/x270cm/html/x270-cm-datasheet.htm, which is hereby incorporated by reference. A USB interface (633) couples the port (632) to the processor board (634). A keyboard, LEDs 644 and the LCD display panel (645) also are coupled to the processor board. The processor board is mounted on a unit board (616). Also mounted on the unit board are an Ethernet switch (646), which coupled to the Ethernet connectors, a charger (653) and a power supply (655). A battery (657) may be housed in the enclosure.

Components of the add-on MoCA board include one MoCA chipset for device emulation or two MoCA chipsets for in-line testing. In one embodiment, a Compulab SB-X270 board with processor is used. A suitable MoCA chipset is available from Entropic, such as part numbers EN2210/EN2211. The parts are generally described in "Entropic's Next Generation c.LINK™ Improves Price/Performance for Digital Entertainment Networks" accessible (on Jan. 3, 2009) at http://files.shareholder.com/downloads/entr/0x0x126497/11e2ba59-90a0-4bf3-8a9c-45e942744d46/ENTR_News_2006_6_5_General_Releases.pdf, in "EN92210SDK, EN2210 Coaxial Home Network Software Development Kit" accessible (on Jan. 3, 2009) at http://www.entropic.com/briefs/18-00PB-C010B_EN92210SDK.pdf; and in "EN2210, Coaxial Network Controller" accessible (on Jan. 3, 2009) at http://www.entropic.com/briefs/18-00PB-C030A.pdf. The interface to the parts is extensively described in a reference manual 11-0016-8103, which is an Entropic confidential document, and in release notes with various document numbers. One set of drivers provided for these parts is Linux-based. Other operating systems and drivers might be used. This add-on MoCA component could, alternatively, be integrated into the main unit.

Two Entropic MoCA chipsets are used for in-line testing, coupled to an Ethernet bridging chip. One MoCA chipset faces the device being evaluated, such as a STB, and the other faces a second MoCA device, such as an HBR or other STB that is functioning as a DVR and streaming video to the device being evaluated. The Ethernet bridge passes packets between the MoCA chips. It also passes packets between one of the MoCA chips and a wired or wireless Ethernet port, such as an RJ-45 connector or a WiFi adapter. The bridge may be coupled through a switch.

Use of two MoCA chips combined with a bridge allows the device to be inserted, in-line, between other MoCA components. Because the MoCA chips include an RF interface, the design provides RF isolation between the chips. In one device, two halves of a board carrying the two MoCA chips are isolated and shielded from each other. The chips can be placed on opposite sides of the board, with separate signal paths and electrical grounds provided. Use of separate power supplies with separate filters that increase impedance between the board halves helps isolate one chip from the other. Physically separate shielding (nickel or nickel plated plastic) can be added over analog front ends of both RF components, independently covered. A plastic enclosure for the board carrying the chips has a metallic paint sprayed on, for further shielding, but this is for general FCC compliance purposes, as opposed to RF isolation. A rubber pad approximately 3-4 mm this is provided, with favorable RF absorption up to 2 GHz. This thickness of pad does not cause significant heat build-up, but use of a thicker pad might require attention to heat issues. As a heat mitigation measure, the chips can be located near edges of the circuit board and near vents.

In development, it was found that effective RF isolation of the MoCA chipsets eliminated packet loss across the pair of MoCA chips. Given the MoCA standard target bit error rate ("BER") of $1 \times 10^{-9}$, RF isolation would be considered effective if packet loss across the device were less than $1 \times 10^{-10}$ and even more effective if packet loss across the device were less than $1 \times 10^{-12}$.

Drivers supplied by the MoCA chipset manufacturer were readily modified to accommodate bridging of a MoCA chip to another MoCA chip or to a wired or wireless Ethernet adapter.

Video quality measurement may be calculated using components adapted from Telchemy's technology. One patent issued to Telchemy that describes calculation of a score for audio signals that is considered equivalent to a Mean Opinion Score (MOS) is U.S. Pat. No. 7,058,048, entitled "Per-call quality of service monitor for multimedia communications system." A brochure that describes application of Telchemy's technology to video is accessible at http://www.telchemy.com/product_lit/VQmon_SA_Brochure.pdf. A brief white paper entitled "VQmon Performance", including sections on VQmon Algorithm Description and VQmon Correlation with Subjective Test Data is accessible at http://www.telchemy.com/vqmonperf.html. These three documents regarding objective calculation of a MOS measure are hereby incorporated by reference.

FIG. 7 depicts combination of the MoCA module with Ethernet components to provide a MoCA to Ethernet interface. A MoCA module 710 includes a pair of coaxial terminals 411 and a MoCA to Ethernet interface 712. As MoCA uses Ethernet at the data link layer, the interface 712 translates between an RF signal over coaxial cable and an electrical signal over a wired physical layer, such as CAT-5. An Ethernet switch 721 is connected to at least a port interface 722, which may be a 10/100 MB interface or a Gigabit interface. Two ports 723 are provides, such as RJ-45 jacks, to which Ethernet is connected. Alternatively, other Ethernet connections, such as Ethernet over Firewire, USB, or Powerline, could be used by substituting an appropriate interface 722 and connector(s) 723. In a commercial data application, the wired interface is more prevalent.

Use Cases

The test unit described can be used either in-line or to terminate a coaxial connection. We first describe the in-line usage for identifying the source of video artifact while observing it on a device connected to a set-top box.

In-Line IPTV Testing

FIG. 2 depicts a test unit (124) coupled in-line between a jack (223) and a set-top box (125). Typically, the STB is located close to the jack, for instance within five to 10 to 20 feet. Standard practice is to use a single piece of coaxial cable to connect the jack to the set-top box. When the test unit is placed in-line, two pieces of coaxial cable are required.

When the test unit (124) is coupled in line, an Ethernet bridge combined with a pair of MoCA chips allows the test unit to passively listen to relayed communications between physically isolated network segments, which are bridged by the test unit. Modified driver software allows the test unit to evaluate the packet stream across the bridge without introducing new artifacts such as jitter or packet loss. The packet stream can be evaluated at wire speed without decryption of packets. Alternatively, the test unit (124) can be capable of spoofing the MAC addresses of the respective devices and could be adapted to actively participate in the MoCA sessions, but doing so would increase the likelihood that the device would introduce new artifacts. Bridging has proven to be satisfactory for in-line testing, as there is no need for the devices involved in the network to be aware of the presence of the test unit.

In the passive mode, the Ethernet bridge chip bridges packets across networks, so the test unit is not addressed by either the STB or the BHR—they address each other and the bridging handles packet delivery. Passive in-line mode does not insert packets, it just analyzes and bridges the packets. The system is capable of inserting packets, but analyzing the packet stream without inserting additional packets has proven satisfactory.

In an alternative, active mediator embodiment, the test unit would emulate the STB to the BHR and emulate the BHR to the STB. The test unit would be assigned the IP address otherwise used by the STB and would emulate the STB to the BHR. The extensive protocol for setting up the physical and link layers of MoCA is carried out between a home broadband router (which may be incorporated in network terminal or may be a separate device) and the test unit. The test unit, in turn, establishes a second physical and logical network with the STB. On this second network, the test unit emulates the BHR and establishes a MoCA session with the STB.

In this active mediator embodiment, the test unit would respond to probes by the BHR, which establishes the physical characteristics for the connection. The test unit repeats the probe protocol with the STB. At the data link layer, bridging of selected packets across the MoCA chips would allow the data session to be established through the test unit between the STB and the BHR. The test unit would avoid duplication of responses to the BHR's probes. That is, responses from the STB would be used by the test unit to set up the connection between the STB and the test unit. These responses from the STB are not repeated to the BHR, where they would duplicate and potentially conflict with responses generated by the test unit. When the BHR announced transmission characteristics of the signal for the STB, such as MAPs, the test unit would pass these parameters through to the STB. While the STB would not participate in responding to the BHR's probes, it would learn the signal characteristics to expect for the packets that it would decode into a video or audio playback.

In both the passive and active mediator embodiments, the test unit physically isolates BHR and STB, establishing two physically isolated and distinct network segments, contrary to the fundamental mesh architecture of MoCA networks. The test unit modulates and de-modulates signals on the coaxial and bridges the two networks in an Ethernet domain.

With the test unit in-line, the signal repeated to the STB should not introduce any new artifacts. Problems with packet loss, jitter and the like should be present in the connection between the BHR and the STB to the same extent that they are present in the BHR-test unit connection, without the test unit inserted. While the signal between the test unit and STB may be stronger, the test unit does not correct the data timing or make up for lost packets.

To support in-line testing, the unit may include one or more channel guide set ups. In one embodiment, the unit stores up to four guides, which may apply to different regions or different standard packages. The unit is adapted to test using either a channel number or channel name, or to test using a multicast IP address and port number. For digital video recorder sharing, the unit supports unicast video transfer.

Two tests of interest measure video quality and channel changing. The video quality test is generally described above. This unit is particularly well adapted to allow a tester to see a degraded image at the same time packet delivery is being analyzed. The unit is capable of assessing both the video quality, expressed as a mean opinion score or as a media delivery index, and the network quality, measured by bandwidth and packet delivery.

Figure 12:
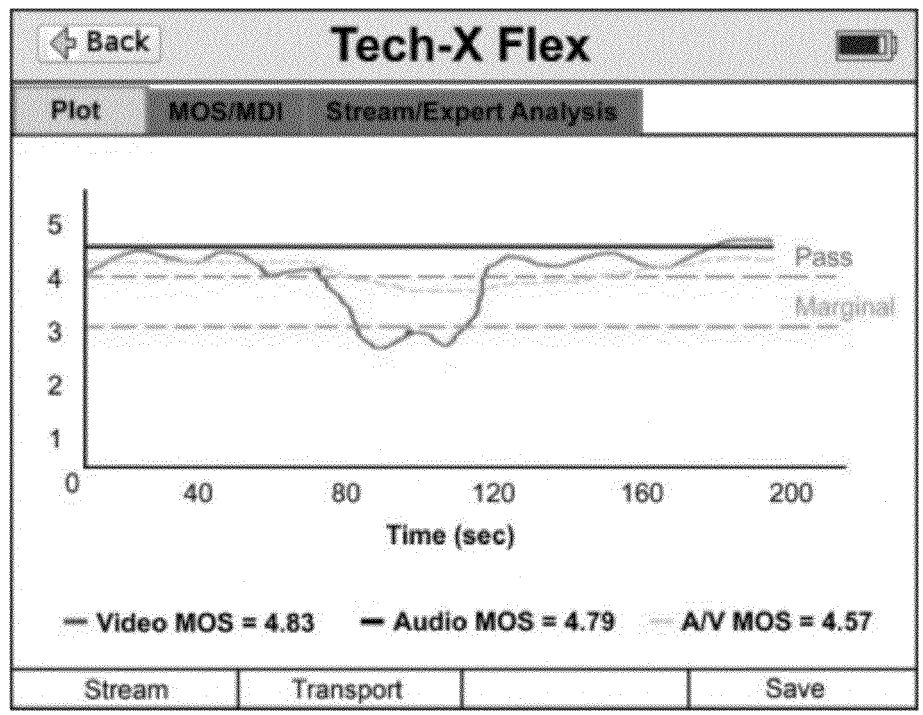

FIG. 12 depicts a summary of MOS scores over time. Similar graphs could be produced for MDI scores. This is a simple, easy to use graph with three graph lines for video MOS, audio MOS and combined A/V MOS. In this graph, the IPTV signal is evaluated with simple figures of merit. A combined figure of merit evaluates the signal reaching the test unit (which may be different from what the STB forwards to a monitor.) Individual figures for audio and video MOS can be used to refine diagnostics. Alternatively, these statistics can be produced in tabular form, for MOS, MDI or both scores. In the figures, upper and lower bounds are depicted.

Figure 13:
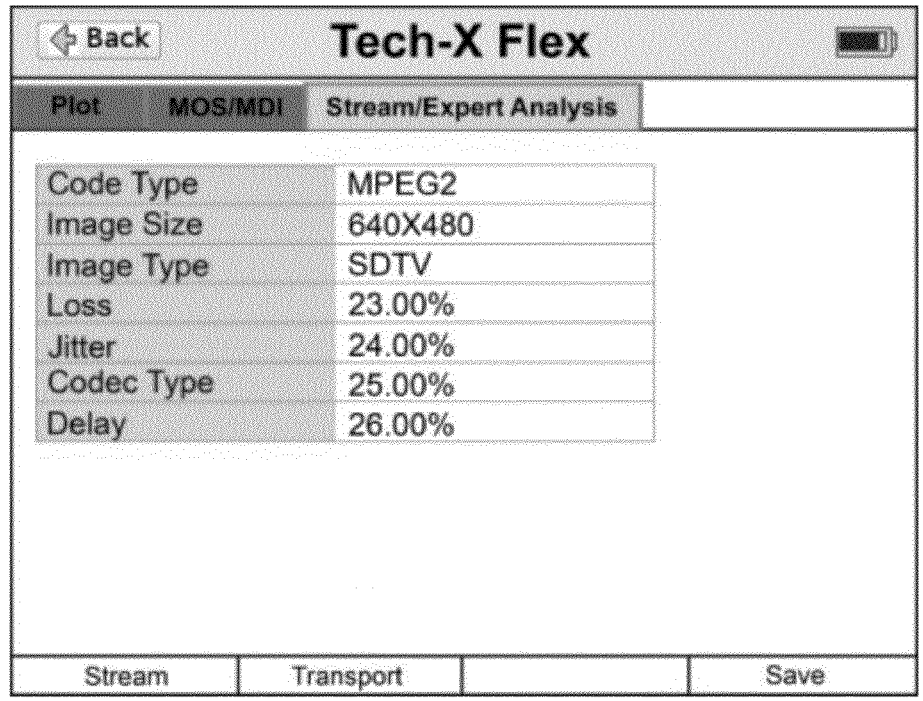

FIG. 13 depicts one aspect of stream analysis with particular diagnostic details, accessed via a Stream Metrics Tab. It gives the encoding type, image size and type, such as MPEG2 encoding of standard TV at 640 by 480 pixels. Encoding type may be as defined in ITU Spec ISO/IEC 13818-1. Image size gives the horizontal and vertical resolution, in pixels. For image type the valid values are SDTV or HDTV. Statistics on contribution of various packet errors to signal degradation also are provided, such as loss, jitter, codec type and delay. Loss indicates the percentage of the overall quality degradation that can be attributed to network packet loss. Similarly, jitter, codec type and delay indicate the percentage of the overall quality degradation that can be attributed to those factors. The four factors sum to about 100 percent, applying algorithms provided by Telchemy.

Channel changing time is also addressed, because it can be a significant consideration in video on demand applications. The implementation of channel changes usually at the head end, rather than local to the set-top box, can cause unsatisfactory delay. A channel change test can measure the amount of time required to join a channel, leave a channel, or to change from one channel to the next, in total.

Figure 16:
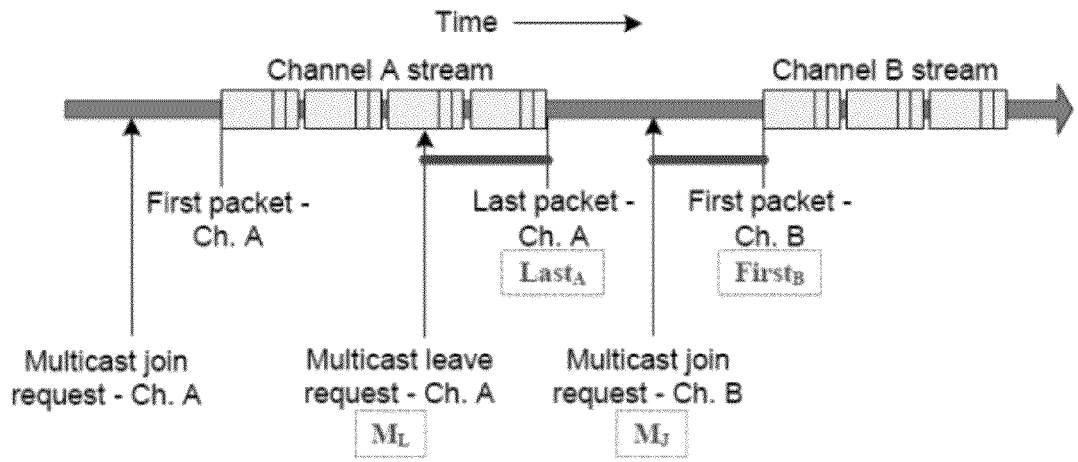

FIG. 16 illustrates one measure of channel change time. During a channel change test, the unit joins the first specified channel, leaves that channel, then joins the second specified channel. During this process, four events are used for the change time calculation, as illustrated. The basic formula for change time calculation is:

$$\text{Time} = (\text{Last}A - ML) + (\text{First}B - MJ)$$

where the individual terms are temporal instances, not quantitative amounts of time. In other words, channel change time equals time it takes to leave the first stream, plus the time it takes to join the second stream, measured from the respective IGMP requests. For reference, the unit also can report Channel Leave Time, which equals the (LastA−ML) term, and Channel Join Time, which equals the (FirstB−MJ) term.

The unit can be coupled in-line between a network terminal, such as an ONT, and an BHR, or it can be coupled between the BHR and a STB. In these positions, it can measure the delivery and quality of video on demand delivery pulled from either a service provider via the WAN or from another set-top box via the LAN.

Set Top Box Testing

The unit can be used to emulate a variety of components, making direct connections to other components under test or across suspect physical media. This and following sections describe use of the unit with various emulations to test various components.

The unit can be connected directly to a STB to test throughput. The unit emulates the BHR to check the MoCA LAN connection and measures bandwidth of the connection with the STB. Typically, if the measured bandwidth of the direct connection is less than 250 Mbps, the STB has a MoCA interface problem and should be replaced.

The in-line tests described above can ordinarily be applied to both STB and HRN testing.

BHR Testing

The unit can be connected directly to the BHR to emulate an STB. With a short and known connection, the MoCA bandwidth between the unit and BHR can be measured to test the router's interface. Typically, if the measured bandwidth of the direct connection is less than 250 Mbps, the BHR has a MoCA interface problem and should be replaced. Additional statistics described above, in the context of in-line testing, also can be generated during an BHR test, without the corresponding image being displayed by the STB.

Alternatively, the unit can emulate an optical network terminal (ONT) or other interface to the service provider's WAN. Again, if the measured bandwidth of the direct connection is less than 250 Mbps, the BHR has a MoCA interface problem and should be replaced.

ONT Testing

The unit also can be connected to an ONT via a short and known connection to measure MoCA bandwidth from the ONT to an emulated STB or BHR. If the measured bandwidth of the direct connection is less than 250 Mbps, the ONT has a MoCA interface problem and should be replaced.

Identification of the ONT or BHR as a problem can lead to replacement of the right component at a lower expense than replacing the STB.

Coax Path Testing; Directional Bandwidth Testing

One or more coaxial cable connections can be tested by connecting the unit to a coaxial terminal. One connection can be tested if the coaxial cable runs from the unit directly to any of a STB, BHR or ONT. A transmission speed of less than 200 Mbps may indicate too many splitters, a nail through a cable, a bad connection (such as a poor crimp at the end of a connector or a broken coax core), or attenuation due to cable length.

Figure 10:
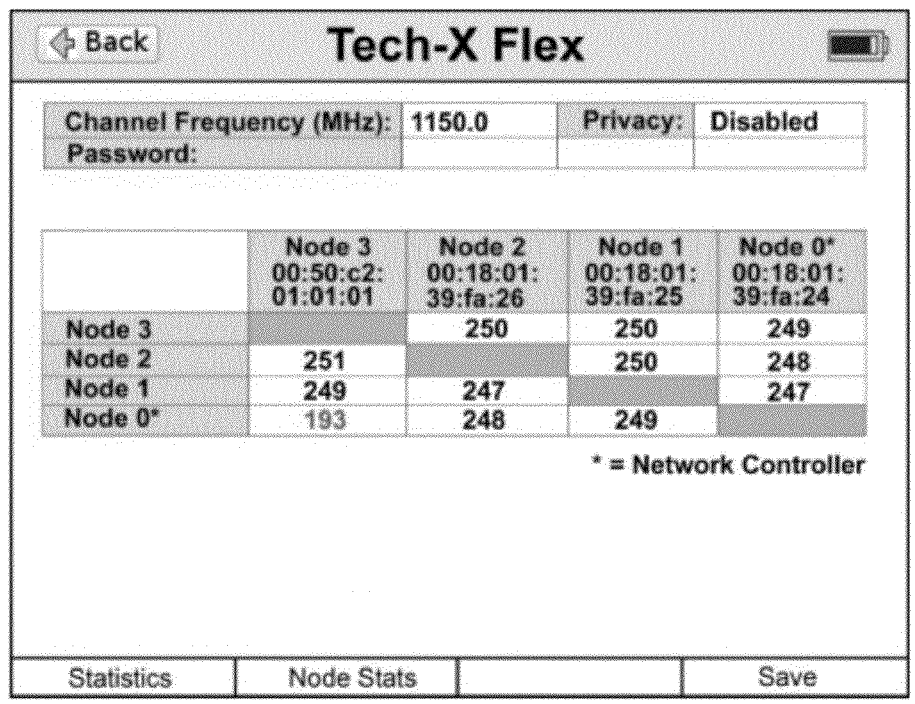

More generally, as depicted in FIG. 10, the unit can connect to multiple nodes and either measure bandwidth between the unit and the nodes or query the nodes to determine bandwidth among the nodes. When the node IDs are mapped to the physical plant, for instance, using their MAC addresses, substantial information regarding multiple coax paths can be learned in a single diagnostic. Connections that support less bandwidth than required for video on demand may be coded. In FIG. 10, the value "193" for a connection between Nodes 0 and 3 might be colored red, to attract the tester's immediate attention.

Interference Check

Figure 11:
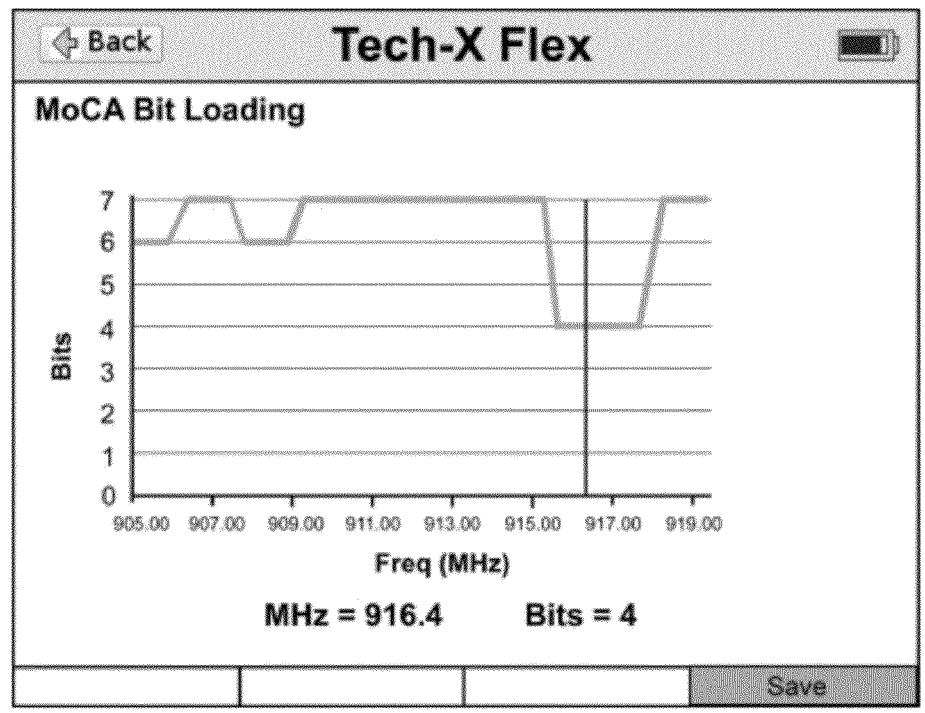

Sometimes, bandwidth is low, even though the STB, BHR or ONT is good. A Node statistics are provided for each device on the network, including the unit. These statistics may be accessed via a tabbed interface, one tab per device. Statistics for each device (not illustrated) may include bit rate, GCD bit rate, cyclic prefix length, phase offset, and log mean gain. The Bit Rate is the physical layer bit rate for the link in Mbps, up to the theoretical maximum, such as 270 Mbps for some MoCA implementations. The GCD Bit Rate is the physical layer bit rate for broadcast packets, which is generally lower than the Bit Rate. The Cyclic Prefix Length is the gap between symbols at the physical layer. The phase offset measures a distance between two nodes' center frequency. A large offset value, such as 1000, lowers the margin for interoperability. The Log Mean Gain is for the analog amp of the signal on the receive side, over some number of packets. In some embodiments, the previous 256 packets are considered for this analysis. Node statistics may be linked to a graph of bit loading by frequency. FIG. 11 depicts a bit loading graph that can indicate the presence of an interferer. An ideal MoCA channel carries 8 bits per symbol, but networks adjust this loading downwards as necessary to reduce bit error rates (BER). In this graph, the bit loading of a subcarrier between about 916 and 918 MHz is lower than the bit loading on other subcarriers. A tester can use this characteristic of the bit loading profile to identify likely source of interference. The unit can, optionally, include a table of typical interferers arranged by the frequency at which interference has been observed.

High-Speed Data Testing

The unit can be used in lieu of a laptop to perform functions such as an IP ping, trace route, web browsing and video viewing. An IP ping can verify that you can reach the Internet via dotted IP addressing and urls. It can also isolate misconfigured DNS servers. A trace route can be used to view all of the hops required to reach the destination url or dotted IP address and to identify segments of delay. Use of the web browser and video content analysis are alternative ways to test WAN performance.

Diagnostic Capabilities

FIGS. 8-17 depict one version of displays that can be used by a technician conducting diagnostics with the unit. Some of these displays are explained above.

Not shown is a web browser that uses the display. The web browser allows a user to access web pages from the internet and view them on the screen. It may be especially useful for verifying that internet access is available, beyond a simple ping test. If a residential subscriber cannot view a web page but the tester can with the unit, the tester can normally concludes that the trouble exists with the subscriber's web browser, computer, or home network configuration. A browser may also be used to verify that a DNS is available.

The web browser is similar to a browser used on a desktop computer, except that the smaller screen may require more use of the scroll bars. Furthermore, aside from basic hyperlinks, most webpage controls may not work correctly. In some cases, complex pages with extensive internal scripting may not display correctly or at all, so it is recommended that a tester access simple, fast-loading web pages to perform tests. In summary, the browser is intended as a testing tool, not as a fully-functional interface to the internet. In some embodiments, a fully-functional browser could be provided, but at the expense of more storage on the unit for the browser and its plug-ins.

As described elsewhere, the browser also may support extensive help or manual pages and even tutorials for a new user or for training a tester.

Figure 8:
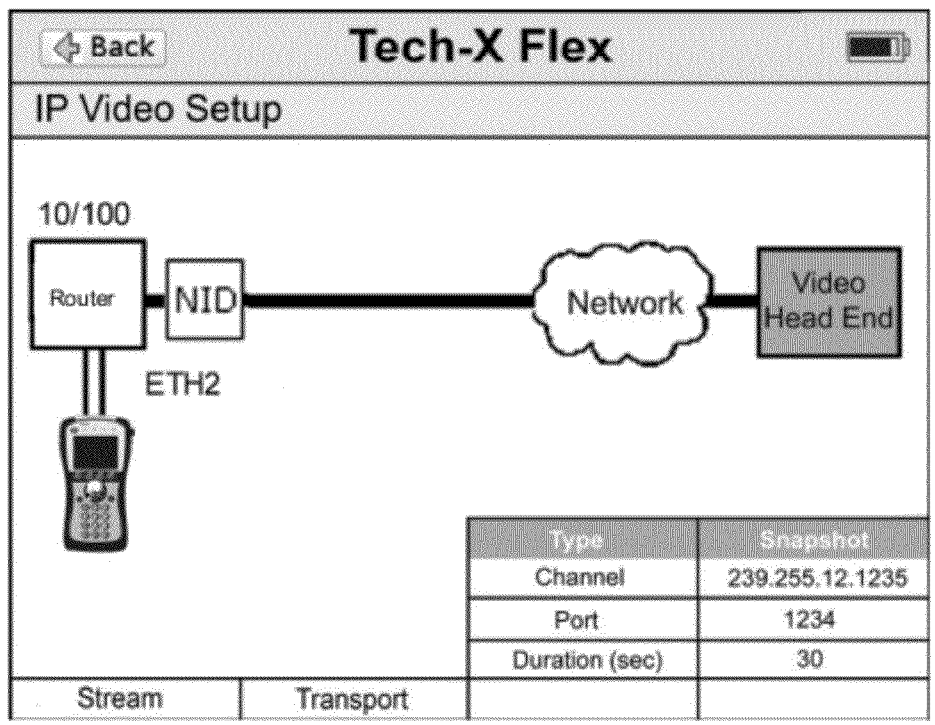

FIG. 8 depicts graphical confirmation of the test set-up. The user selects a test scenario from a menu, for instance, and the unit graphically depicts principal components to help guide the tester in coupling the unit into the network under test. The unit may, optionally, indicate whether any direct links with the unit are active, such as the link from the unit to the router, 821-811. A color code, blinking path or other representation can be used to identify an intended link that has not yet been completed. FIG. 8 depicts the unit 821 linked to a switch, hub or router 811, through a network interface device (NID) 812, through a network 813 to a video head end 814. For this IP Video Setup to test video quality, the connection to the router could be via MoCA, to a BHR, or via wired Ethernet to cable or DSL modem and router. One or more quick test buttons are available for likely next tests. A table 823 may be displayed that indicates key values, such as the IP address or channel assigned to the unit, the active port, and the duration of the current connection. The duration assists a tester in verifying a valid physical and logical connection. It also effectively flags dropped connections.

Figure 9:
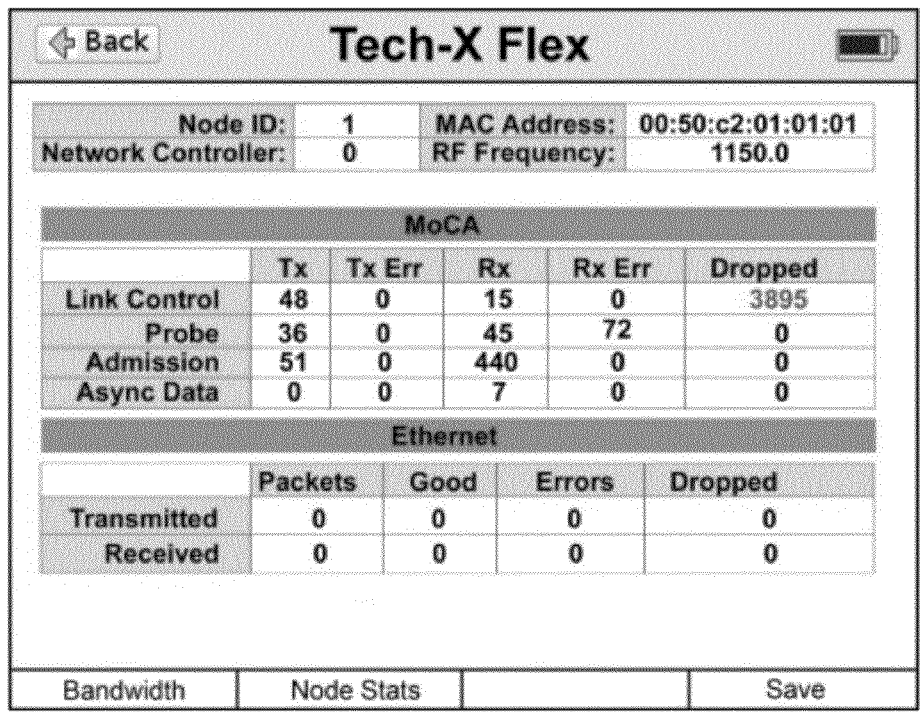

FIG. 9 gives an overview of MoCA testing. It shows the configuration of both LAN and WAN channels. It facilitates verification of the STB to MoCA connection. It supports verification of data rates between the STB and either a router or other STB. This helps a tester figure out whether a problem relates to physical or link layer issues. In FIG. 9, the device panel 910 includes a Node ID, which is a MoCA node number assigned by the network controller (NC) upon admission. In some embodiments, it ranges from 0 to 7, but it is extensible, for instance to 0-15 (0-F hex) with the evolution of the MoCA standard. The MAC Address is for a particular interface. The Network Ctrl is the node ID of the NC device. This can be correlated with the MAC address of a particular device using a separate screen on the unit or by adding information to this screen. The RF frequency is the frequency of the MoCA channel being used. The MoCA panel 920 gives transmit and receive packet counts by category for link control, probes, admission to the network, and asynch data. Link Control details traffic received by and transmitted from the unit. Probe messages are physical layer messages that are used to evaluate the physical network among nodes. Admission request and associate negotiations are a type of link control that is used when a new devices asks the NC for admission to the network. Async Data numbers represent the Ethernet frames carrying user data, such as IP video packets, as measured at the coax/MoCA interface. If the unit is working properly, these should be the same numbers as the Ethernet statistics published on the Bandwidth page, FIG. 10, described above. A color code can be used to highlight an out of bounds condition, such as "3895" dropped link control packets. The Ethernet panel 930 also indicates packet counts. In the illustrated example, the unit has had difficulty establishing a session, so no Ethernet packets have been tabulated. The Ethernet statistics describe Ethernet frames received and transmitted by the unit carrying user data, such as IP video packets. The measurements are taken by the Ethernet circuitry of the unit, which is a layer below the MoCA interface. If the unit is working properly, these numbers should be the same as the Async Data, above.

In other displays, not illustrated, MoCA testing can return physical and broadcast transmission and receipt rates. The physical rate is the rate of the path. The broadcast rate indicates the traffic over the physical path. The unit further can report CP length, phase offset and log gain mean. The CP length indicates the gap between symbols. If the value is 65, the node is not fully bit loaded, which may indicate that there is room for additional data if the sub-carriers are more fully utilized. The normal range for CP length is generally between 30 and 35. The phase offset is a measure of difference at a center frequency between phases of two nodes. If the nodes are too far out of phase, they have trouble locking on one another. Generally, a phase offset of less than 1,000 is workable. The log gain mean indicates the analog signal amplitude in the receiver. The unit also can report node state and can graph transmit and receive bit loading.

FIGS. 14-15 provide further stream metric statistics. FIG. 14 provides stream analysis results that impact video quality of service. The first tab addresses Stream Metrics. Video sometimes is encoded with I, P and B frames. Video coder group of pictures (GOP) structure, representing the frame sequence in use on the stream with respect to I, P, and B frames. A default can be used by the unit, if the actual frame types and GOP structure cannot be dynamically detected from the stream. Options for GOP type include:

A—I-frames only, for example:
III . . . I

B—One I-frame followed by P-frames, for example:
IPPP . . . PIPPP . . .

C—One I-frame followed by P- and B-frames with two B-frames between each pair of anchor frames, for example:
IBBPBBP . . . BBIBBP . . .

D—All P-frames, for example:
PPPP . . . P

E—One I-frame followed by P- and B-frames with one B-frame between each pair of anchor pictures, for example:
IBPBP . . . BIBP . . .

Over some time period, statistics regarding the respective frame types and the quality of frames received are compiled and can be displayed in a table. In the table, Frames Total is number of frames received, by type. Lost indicates a total number of packets lost containing data for the respective frame type. These results may be packet counts, not frame counts. Note, that if packets for one frame type show an inordinate amount of loss compared to others, there may be a problem with network congestion and/or configuration. For example, some NEs may be configured to discard video B-frame data during periods of heavy congestion. In the table, discards are the total number of packets discarded by the jitter buffer emulator containing data for the respective frame type; for example, the total number of packets discarded containing I-frame data. These results are packet counts, not frame counts. Impairments gives the total number of frames errored, by type. A frame is considered errored if a single packet containing data for it is lost or discarded.

In the second table of the figure, three lines refer to Forward Error Correction (FEC) statistics. FEC is added to packets to allow recovery from errors in a preselected number of bits. FEC calculations are more complex than CRC codes, so the CRC codes are sometimes evaluated before invoking FEC routines. FEC Effect indicates the effectiveness of the forward error correction applied to the stream in correcting errors. Opt FEC Blk Size indicates the number of packets in an FEC block which is used when calculating the FEC effectiveness. (A technician needs expert understanding of FEC encoding to use this information.) Opt FEC Crct Pkts give the number of correctable packets or bit errors in an FEC block which is used when calculating the FEC effectiveness. The peak to mean receive rate is a ratio. In this example, the receive rate is very constant, with only a one percent variation between peak and mean.

A Stream Description tab in Stream Results FIG. 14, which has a display that is not illustrated, provides additional quality of service statistics, including GOP Type, GOP Length, Receive Rate and PK RCV Rate. The GOP Type identifies the GOP structure type of the stream. If the structure was detected by the analysis, this value represents the detected structure. Otherwise, it represents the type specified at test launch. The GOP Length is the total number pictures in a single GOP. If the structure was detected by the analysis, this value represents the detected structure. Otherwise, it represents what was specified at test launch. The Receive Rate is a speed of frames received, in kbits/sec. Pk Rcv Rate gives the peak speed of frames received, in kbits/sec.

The third tab of the Video QoS in FIG. 14, is Video Scores which display several statistics. The VSTQ is the Video service transmission quality. This is a codec-independent measure related to the ability of the bearer channel to support reliable video. Valid values in one embodiment are 0-100. VSPQ is an abbreviation for Video Service Picture Quality. This is a codec-dependent measure of the subjective quality of the decoded video stream. It is equivalent to a V-MOS score, using a different scoring range of 0-100. Gap VSPQ measures the Video Service Picture Quality during gap state periods. This is a codec-dependent measure of the subjective quality of the decoded video stream. It is equivalent to a V-MOS score, using a different scoring range. Similarly, Burst VSPQ measures Video Service Picture Quality during burst state periods. This also is a codec-dependent measure of the subjective quality of the decoded video stream. The VSMQ is a Video Service Multimedia Quality. This is a codec-dependent measure of the subjective quality of the decoded audio and video stream. It is equivalent to an AV-MOS score, using a different scoring range. In one embodiment, valid values are 0-100. The ESNR gives an estimated average peak signal-to-noise ratio value for pictures in the stream, in dB. This value is derived based on other metrics in some embodiments and could be measured directly, in other embodiments.

FIG. 15 illustrates a video quality of service display, particularly the stream metrics tab. The Pkt Discard Rate reflects the number of packets discarded. Packets may be discarded due to jitter or similar reasons by a buffer emulator in the unit that simulates the STB's buffer. In addition to jitter, the buffer emulator may discard packets when the buffer is too full to handle all incoming packets or arrives too late to contribute to the media presentation. The OOS Pkt Rate give the number of video/audio stream packets that arrived out of sequence, as detected by the buffer emulator. The Burst Loss Rate indicates an average percentage of media independent units (MIUs) lost and/or discarded during burst periods.

At any given moment, the analysis software regards the media stream to be in one of two states: a "gap" state or a "burst" state. The gap state is the default, in which the stream remains unless pushed into the burst state by packet loss. The criteria for entering a burst state may include two successive packets lost or discarded, and/or subsequent packet loss within 128 msec of the initial loss event. While in gap state, if two successive packets are lost but there is no further loss for 128 msec, the stream remains in gap state. While in burst state, if the stream exceeds 128 msec without any packet loss, it returns to gap state. Any packet loss event within 128 msec of the most recent event causes a burst state to perpetuate.

The distinction of gap versus burst states provides two models for estimating the probability of packet loss, and therefore the ability to provide certain test metrics that are more accurate for a stream in the respective state.

The Burst Length gives an average burst period length in milliseconds. The Gap Loss Rate is an average percentage of media independent units (MIUs) lost and/or discarded during gap periods. Gap Length is the average gap period length in milliseconds.

Also available, but not illustrated, is an MPEG statistics tab with the following statistics. The MPEG Sync Loss statistic gives the number of times that the sync byte of a packet header was errored or not present for two consecutive transport stream packets. The MPEG Sync Byte Err is the number of times that a transport stream sync byte did not appear following a 188-byte or 204-byte transport stream packet. MPEG Cont Err indicates the number of times that the continuity count of a received packet did not increment by one, as compared to the previous packet. The continuity count is a 4-bit field in the packet header that increments from 0-15 for each transmitted packet, resetting at zero as necessary. Continuity count errors are normally caused by lost or out-of-sequence packets. The MPEG Trnspt Err is the number of packets that indicated a transport error, by means of the transport error bit in the packet header. The transport error bit is set to "1" when at least one uncorrectable bit error exists in the packet. The PCR Repetition Err gives the number of times that the interval between PCR (program clock reference) transmissions exceeded 100 ms, if the discontinuity indicator is not set. The PCR is used as a time synchronization tool between the encoder and decoder. If the discontinuity indicator is not set, the encoder expects a 100 ms or smaller interval between PCRs. Both the PCR and discontinuity indicator are part of the packet header. Also accessible via the MPEG Stats tab is an PTS Err count of the number of times that the PTS (presentation time stamp) repetition period exceeded 700 milliseconds. The PTS is part of a packet header and indicates the exact moment where a video frame or an audio frame has to be decoded or presented to the user respectively. It is useful for synchronization of the audio and video streams.

The jitter/delay statistics tab, which accesses a display that is not shown, includes additional packet jitter and delayed statistics. The MAPDV is the true average mean-absolute packet delay variation in milliseconds. This is a measure of jitter. Packet delay variation is a calculation based on the variation of a packet's expected arrival time versus its actual arrival time. Each packet has its own PDV, which is determined by:

$$|\text{Expected time} - \text{Arrival time}|$$

(Note the use of absolute values.) So, if a packet is expected to arrive at time1 but actually arrives at time2, it has a PDV of $|time1-time2|$. Typically, individual PDVs are used for calculating an average for multiple packets in a stream, or reporting the maximum PDV experienced during a measurement period. PDV calculation uses a reliably determined expected arrival time of packets, such as with an MPEG-2 transport stream that has a program clock reference shared between the encoder and decoder. Using the constant bit rate of the MPEG stream and PCR timestamps in packet headers, a decoder knows when to "expect" a packet to arrive, with variations assumed to be equipment involved with the transport. While the term "jitter" is widely used, packet delay variation (PDV) is often preferred because of its more specific definition. Related to jitter is delay.

Packet-to-packet delay variation (PPDV) is a statistical calculation of delay variation, based on comparisons of delay from one packet to the next. It differs from basic packet delay variation (PDV) which looks at variations in arrival time overall, not necessarily variations between adjacent, sequential packets. As an example, consider four sequential packets, whose inter-arrival times are 40, 42, 38, and 39 msec respectively. The PPDV of the second packet is 2 msec (|40−42|), the PPDV of the third packet is 4 msec, and so forth. To calculate an average PPDV, the process continues for all selected packets in the measurement stream, with the individual PPDVs averaged at the end. On the unit's display, PPDV is the packet-to-packet delay variation in milliseconds, according to a calculation model defined in RFC 3550.

Figure 17:
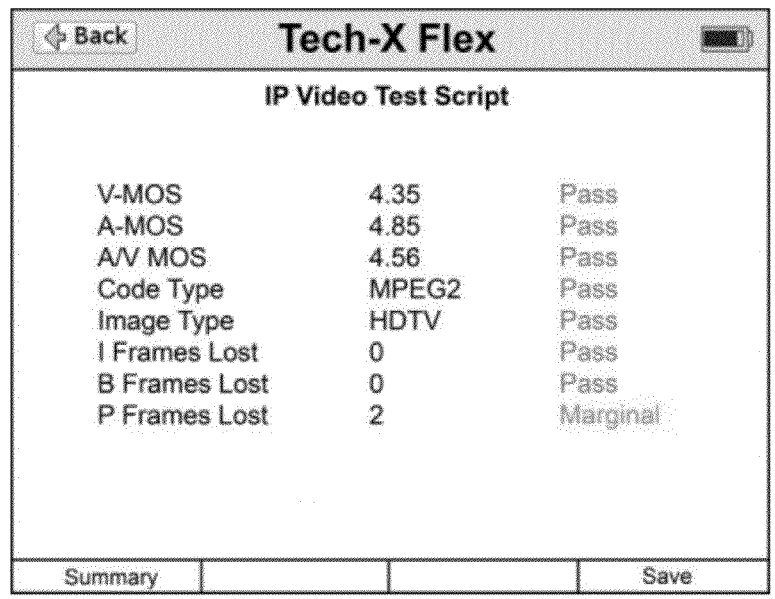

FIG. 17 illustrates running an IP video test script and providing a user with a summary evaluation of multiple diagnostics. Three MOS scores are given with a simple qualitative evaluation, such as pass/marginal/fail, which may be color coded for instant recognition. The Code and Image Types identify the underlying data stream in terms that the technician should be able to match to the channel characteristics that typically are revealed in a channel guide, for instance by channel number and whether the image is provided in HD. The script also can give frames lost by I/B/P frame time. As an alternative to MOS scores, MDI scores could be given.

Media delivery index (MDI) is a standard for evaluating the quality of media delivered over a packet based network, including MPEG video. It focuses on the evaluation of jitter and packet loss, which are the primary network impairments that impact the delivery of video and other time-sensitive streaming media. In this respect, it is a packet-level, network-focused type of evaluation, unlike other techniques which may focus on the characteristics of the media streams themselves, such as compression, codec, and frame loss. MDI may be used to evaluate any voice, video, and other types of streaming media. An MDI calculation consists of two components: the Delay Factor (DF) and the Media Loss Rate (MLR), typically presented as:

MLR:DF

The MLR is the count of lost or out-of-order packets over a selected time interval, where the only packets monitored are those carrying the respective streaming media. The DF is the maximum difference observed at the end of each media stream packet, between the arrival of media data and the drain of media data. This assumes the drain rate is the nominal constant traffic rate for constant-bitrate streams or the piecewise computed traffic rate of variable-rate media stream packet data. MDI is defined by the IETF RFC 4445, which is available at IETF.org web site.

Some Particular Embodiments

The present invention may be practiced as a method or device adapted to practice the method. The invention may be an article of manufacture such as media impressed with logic to carry out computer-assisted analysis of signal quality on a MoCA network and troubleshooting of the network.

One embodiment is a method of testing MoCA signals routed to a set-top-box and evaluating performance of the set-top-box. This method includes coupling a computerized device to a physical medium, such as a pair of coaxial cables, in position between a set-top-box (abbreviated "STB") and a signal source. If another physical medium such as a power line or telephone line is used to with the MoCA protocol, then that would be the physical medium attached to the computerized device. Similarly, if another time sharing, coordinated data transmission protocol were used, the method would apply to that protocol. The method continues with the computerized device joining a MoCA network to which the STB otherwise belongs. The computerized device, connects the MoCA network to the STB by relaying signals that would be exchanged between the MoCA network and the STB, if they were in direct communication with each other. In some embodiments, the computerized device may pose as the STB being evaluated. The method continues with the computerized device analyzing packets received from the MoCA network that comprise a video signal to evaluate a quality of the video signal and reporting at least a summary of the quality of the video signal while enabling a user to view output of the STB on a TV or monitor.

In some embodiments, the quality of the video signal is expressed as a mean opinion score (abbreviated "MOS"). This MOS can be calculated from at least an analysis of packet headers, or from at least an analysis of packet loss and classification of types of lost packets without decryption of encrypted video signals, or from both sets of statistics. In other embodiments, the quality of the video signal is expressed as a media delivery index (abbreviated "MDI"). This MDI also can be calculated from at least a delay factor and a media loss rate, from analysis of packet headers, or from at least an analysis of packet loss and classification of types of lost packets without decryption of encrypted video signals, or from both sets of statistics.

A closely related method tests MoCA networks and signals exchanged between a set-top-box and a router and between the set-top-box and additional MoCA enabled devices. This related method includes also begins with coupling a computerized device to a coaxial cable in place of a set-top-box (abbreviated "STB") or using a computerized device already coupled in place. That is, the physical coupling is not necessarily a step of this or the prior method embodiment. Aspects of the prior method also apply to this method, including the nature of the physical medium and the protocol used. This related method also includes the computerized device joining a MoCA network to which the STB otherwise belongs. The computerized device analyzes signal bandwidth and packets received from a router on the MoCA network and reports the quality of the video signal received from the router.

In some embodiments, the computerized device further establishes a point-to-point a session with at least one remote MoCA enabled device and analyzes effective signal bandwidth and packets received from the remote MoCA enabled device. The remote MoCA enabled device is, for instance, a STB, a STB with digital video recording capabilities, a media center, =or a STB with decoding capabilities distinct from the first STB, or another test unit.

Using analysis of the signal from the signal source and/or analysis of the packets from the remote MoCA enabled device, the computerized device reports the quality of the video signal received from the remote MoCA enabled device.

In some embodiments, analyzing for the router and/or the remote MoCA enabled device are performed for an encrypted signal received without decrypting the signal received.

In some embodiments, analyzing the signal bandwidth to evaluate the quality of service further includes evaluating a unicast signal at a location of the STB. In other embodiments, analyzing the signal bandwidth to evaluate the quality of service further includes evaluating a multicast signal at multiple locations, repeating at least the coupling step at the multiple locations.

Each of these methods may be embodied in a computer program on a machine readable storage medium, suitable to be loaded onto hardware and then to practice the method. This computer program(s) may practice the analysis described and, further, may control MoCA signal processors to carry out the methods described. The computer program(s) may be a significant component of the following devices.

One device embodiment is used to test MoCA signals routed to a set-top-box and evaluating performance of the set-top-box. This device includes first and second MoCA signal processors, in communication with each other, with an effective extent of RF isolation or attenuation between each other. An effective extent of RF isolation or attenuation prevents cross-talk between the processors sufficiently that both processors can use the same band and, potentially, the same channel within a band. If one processor filters out certain packets received, they are not detected by other MoCA enabled devices that are receiving packets relayed and output by the other processor. The device further includes a first coaxial port coupled to the first MoCA signal processor and a second coaxial port coupled the second MoCA processor, plus a display viewable by a user. It further includes logic running on hardware, the hardware coupled to the first and second MoCA signal processors and to the display. The logic is adapted to communicate via the first MoCA signal processor with a signal source, including joining a MoCA network, to communicate via the second MoCA signal processor with a set-top-box (abbreviated "STB"), including emulating the signal source to the STB, to analyze packets received from the MoCA network that comprise a video signal to evaluate a quality of the video signal, and to report on the display a summary of the quality of the video signal while enabling a user to view output of the STB on a TV or monitor.

As with the methods above, if another physical medium such as a power line or telephone line is used to with the MoCA protocol, then the port would be suitable to attach that physical medium to the computerized device. Similarly, if another time sharing, coordinated data transmission protocol were used, the signal processors would apply that protocol.

Also following the methods above, the device may further include second logic running on the hardware that evaluates the quality of at least one video signal received by the device in the packets. In some embodiments, the quality of the video signal is calculated as a mean opinion score (abbreviated "MOS"). This MOS can be calculated from at least an analysis of packet headers, or from at least an analysis of packet loss and classification of types of lost packets without decryption of encrypted video signals, or from both sets of statistics. In other embodiments, the quality of the video signal is calculated as a media delivery index (abbreviated "MDI"). This MDI also can be calculated from at least an analysis of a delay factor and a media loss rate, analysis of packet headers, or from at least an analysis of packet loss and classification of types of lost packets without decryption of encrypted video signals, or from both sets of statistics.

A closely related device tests MoCA networks and signals exchanged between a set-top-box and a router and between the set-top-box and additional MoCA enabled devices. This related device includes a first MoCA signal processor, a first coaxial port coupled to the first MoCA signal processor, and a display viewable by a user. It further includes logic running on hardware, the hardware coupled to the first MoCA signal processor and to the display. The logic is adapted to establish, via the first MoCA signal processor, a point-to-point session with at least one remote MoCA device, including joining a MoCA network, to exchange packets with the remote MoCA device, to analyze signal bandwidth and the packets received from the remote MoCA device to evaluate a quality the packet exchange, and to report on the display a summary of the quality of the packet exchange.

As with the device and methods above, if another physical medium such as a power line or telephone line is used to with the MoCA protocol, then the port would be suitable to attach that physical medium to the computerized device. Similarly, if another time sharing, coordinated data transmission protocol were used, the signal processors would apply that protocol.

Also following the device and methods above, this device may further include second logic running on the hardware that evaluates the quality of at least one video signal received by the device in the packets. In some embodiments, the quality of the video signal is calculated as a mean opinion score (abbreviated "MOS"). This MOS can be calculated from at least an analysis of packet headers, or from at least an analysis of packet loss and classification of types of lost packets without decryption of encrypted video signals, or from both sets of statistics. In other embodiments, the quality of the video signal is calculated as a media delivery index (abbreviated "MDI"). This MDI also can be calculated from at least an analysis of packet headers, or from at least an analysis of packet loss and classification of types of lost packets without decryption of encrypted video signals, or from both sets of statistics.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for testing MoCA and similar networks, systems including logic and resources to carry out testing, systems that take advantage of computer-assisted testing, computer readable storage media impressed with logic to carry out testing, or data streams impressed with logic to combine with hardware and carry out testing. It is contemplated that modifications and combinations will readily occur to those skilled in the art, which modifications and combinations will be within the spirit of the invention and the scope of the following claims.

We claim as follows:

1. A method of testing MoCA signals routed to a set-top-box and evaluating performance of the set-top-box, including:
    coupling a computerized device to a physical medium, in position between a set-top-box (abbreviated "STB") and a signal source;
    the computerized device joining at a physical layer a first MoCA network to which the signal source belongs by emulating at the first physical layer a STB;
    the computerized device creating at a physical layer a second MoCA network coupled to the STB by acting as a network controller at the second physical layer;
    the computerized device bridging both command and content packets between the first and second MoCA networks, thereby connecting the STB and the signal source;
    the computerized device analyzing packets received from the first MoCA network that comprise a video signal to evaluate a quality of the video signal; and
    the computerized device reporting the quality of the video signal while bridging the video signal to the STB, whereby a user can view output of the STB on a TV or monitor.

2. The method of claim 1, wherein analyzing the packets received further includes calculating a mean opinion score (abbreviated "MOS") from at least an analysis of packet headers.

3. The method of claim 1, wherein analyzing the packets received further includes calculating a mean opinion score (abbreviated "MOS") from at least an analysis of packet loss and classification of types of lost packets without decryption of encrypted video signals.

4. The method of claim 1, wherein analyzing the packets received further includes calculating a media delivery index (abbreviated "MDI") from analysis at least of packet loss and classification of types of lost packets.

5. The method of claim 1, wherein analyzing the packets received further includes calculating a media delivery index (abbreviated "MDI") from measurement of at least a delay factor and a media loss rate without decryption of encrypted video signals.

6. The method of claim 1, further including using MoCA radio frequency D channels for both the first and second MoCA networks.

7. A method of testing MoCA networks and signals exchanged between a set-top-box and a router and between the set-top-box and additional MoCA enabled devices, including:
- coupling a computerized device to a physical medium, in position between a set-top-box (abbreviated "STB") and a signal source;
- the computerized device joining at a physical layer a first MoCA network to which the signal source belongs by emulating at the first physical layer a STB;
- the computerized device creating at a physical layer a second MoCA network coupled to the STB by acting as a network controller at the second physical layer;
- the computerized device bridging packets from the STB to at least one remote MoCA device, the bridged packets including requests for and a streamed video signal;
- the computerized device measuring signal bandwidth of packets bridged between first and second networks and calculating dropped and errored packet statistics;
- the computerized device analyzing packets received from the first MoCA network that comprise a video signal to evaluate a quality of the video signal; and
- the computerized device reporting at least the measured signal bandwidth and a quality of a video signal received from the remote MoCA enabled device.

8. The method of claim 7, wherein at least some of the bridged packets are dumped to computer readable storage media for analysis by a packet analyzer.

9. The method of claim 7, wherein the analyzing for the router and the remote MoCA enabled device are performed on an encrypted signal received without decrypting the encrypted signal.

10. The method of claim 7, wherein analyzing the signal bandwidth to evaluate the quality further includes evaluating a unicast signal at a location of the STB.

11. The method of claim 7, further including analyzing the signal bandwidth to evaluate the quality further includes evaluating a multicast signal at multiple locations, repeating at least the coupling step at the multiple locations.

12. A device used to test MoCA signals routed to a set-top-box and evaluating performance of the set-top-box, including:
- first and second MoCA signal processors, in communication with each other, with an effective extent of RF isolation between each other;
- a first coaxial port coupled to the first MoCA signal processor and a second coaxial port coupled the second MoCA signal processor;
- a display viewable by a user;
- logic running on hardware, the hardware coupled to the first and second MoCA signal processors and to the display, the logic adapted to
  - bridge control and content packets exchanged between first and second MoCA enabled devices that communicate through the first and second coaxial ports, including emulating at a first physical layer the second MoCA enabled device to the first MoCA enabled device and emulating at a second physical layer the first MoCA enabled device to the second MoCA enabled device,
  - analyze packets received from the first MoCA enabled device that comprise a video signal to evaluate a quality of the video signal, and
  - report on the display a summary of the quality of the video signal while bridging the video signal packets to the second MoCA enabled device, whereby a user the second MoCA enabled device can view video on a TV or monitor while the quality of the video signal is reported.

13. The device of claim 12, further including second logic running on the hardware, the second logic adapted to calculate a mean opinion score (abbreviated "MOS") from at least an analysis of packet headers.

14. The device of claim 12, further including second logic running on the hardware, the second logic adapted to calculate a mean opinion score (abbreviated "MOS") from at least an analysis of packet loss and classification of types of lost packets without decryption of encrypted video signals.

15. The device of claim 12, further including second logic running on the hardware, the second logic adapted to calculate a media delivery index (abbreviated "MDI") from at least an analysis of packet loss and classification of types of lost packets without decryption of encrypted video signals.

16. A device used to test MoCA signals routed to a set-top-box and evaluating performance of the set-top-box, including:
- a first MoCA signal processor;
- a first coaxial port coupled to the first MoCA signal processor;
- a display viewable by a user;
- logic running on hardware, the hardware coupled to the first MoCA signal processor and to the display, the logic adapted to
  - emulate a properly functioning STB,
  - analyze signal bandwidth and the packets received from via the first coaxial port to evaluate a quality of packet exchange, and
  - report on the display a summary of the signal bandwidth and the quality of the packet exchange.

17. The device of claim 16, further including second logic running on the hardware, the second logic adapted to cause the remote MoCA device to send packets comprising a video signal and to calculate a mean opinion score (abbreviated "MOS") from at least an analysis of packet headers.

18. The device of claim 16, further including second logic running on the hardware, the second logic adapted to cause the remote MoCA device to send packets comprising a video signal and to calculate a mean opinion score (abbreviated "MOS") from at least an analysis of packet loss and classification of types of lost packets without decryption of encrypted video signals.

19. The device of claim 16, further including second logic running on the hardware, the second logic adapted to cause the remote MoCA device to send packets comprising a video signal and to calculate a media delivery index (abbreviated "MDI") from at least an analysis of packet headers.

20. The device of claim 16, further including second logic running on the hardware, the second logic adapted to cause the remote MoCA device to send packets comprising a video signal and to calculate a media delivery index (abbreviated "MDI") from at least an analysis of packet loss and classification of types of lost packets without decryption of encrypted video signals.

* * * * *